(12) United States Patent
Nakano et al.

(10) Patent No.: US 8,231,967 B2
(45) Date of Patent: Jul. 31, 2012

(54) SURFACE-TREATED CERAMIC MEMBER, METHOD FOR PRODUCING THE SAME AND VACUUM PROCESSING APPARATUS

(75) Inventors: Katsuaki Nakano, Susono (JP); Junichi Itoh, Susono (JP); Daisuke Hiramatsu, Susono (JP); Tadahisa Arahori, Ashiya (JP); Ken Okamoto, Amagasaki (JP)

(73) Assignees: ULVAC, Inc., Kanagawa (JP); Ferrotec Ceramics Corporation, Tokyo (JP)

( * ) Notice: Subject to any disclaimer, the term of this patent is extended or adjusted under 35 U.S.C. 154(b) by 0 days.

(21) Appl. No.: 13/026,356

(22) Filed: Feb. 14, 2011

(65) Prior Publication Data

US 2011/0151237 A1    Jun. 23, 2011

Related U.S. Application Data

(63) Continuation of application No. PCT/JP2009/064109, filed on Aug. 10, 2009.

(30) Foreign Application Priority Data

Aug. 20, 2008 (JP) .................................. 2008-211292

(51) Int. Cl.
*B32B 3/26* (2006.01)
(52) U.S. Cl. ............... 428/312.6; 428/307.3; 428/307.7; 428/687; 428/446

(58) Field of Classification Search ........................ None
See application file for complete search history.

(56) References Cited

U.S. PATENT DOCUMENTS

| 2002/0064666 A1* | 5/2002 | Shinmo et al. ................ 428/447 |
| 2004/0086689 A1* | 5/2004 | Takahashi et al. ............ 428/141 |

FOREIGN PATENT DOCUMENTS

| JP | 06-000737 | 1/1984 |
| JP | 08-081258 | 3/1996 |
| JP | 11-021187 | 1/1999 |
| JP | 11-312729 | 11/1999 |
| JP | 2001-152307 | 6/2001 |
| JP | 2002-037660 | 2/2002 |
| JP | 2002-180233 | 6/2002 |
| JP | 2003-119087 | 4/2003 |
| JP | 2003-335589 | 11/2003 |

* cited by examiner

*Primary Examiner* — Ling Xu
(74) *Attorney, Agent, or Firm* — Clark & Brody

(57) ABSTRACT

Disclosed is a surface-treated ceramic member which has a coating film-formed surface comprising a ceramic sintered body with a porosity of 1% or less and a sol-gel coating film of a silicon alkoxide compound polymer formed on at least a part of a ceramic sintered body, wherein the coating film and the surface of the body are coexistent in the coating film-formed surface. Specifically the area of the sol-gel coating film accounts for 5 to 80% of the total area of the coating film-formed surface. The surface-treated ceramic member has excellent corrosion resistance and is free from scattering of particles.

6 Claims, 3 Drawing Sheets

SURFACE-TREATED CERAMIC MEMBER, METHOD FOR PRODUCING THE SAME AND VACUUM PROCESSING APPARATUS

TECHNICAL FIELD

The present invention relates to a surface-treated ceramic member and a method for producing the same. More specifically, the present invention relates to a surface-treated ceramic member that is suitable for a member used for heat treatment or as a member exposed to a treatment gas atmosphere, a plasma atmosphere or a vacuum atmosphere at the time of heat treatment, and a method for producing the surface-treated ceramic member. The present invention further relates to a vacuum processing apparatus which employs the surface-treated ceramic member.

BACKGROUND ART

Members such as members for use in a plasma chamber of semiconductor device production equipment are exposed to corrosive gas. Ceramics which are excellent in corrosion resistance are used for the members, because materials poor in corrosion resistance shorten the operation life of the equipment. Also, attachment of particles that are produced by the reaction of the members with the corrosive gas to the device can degrade the quality of the device. For such applications, materials (for example, AlN and $Y_2O_3$) more excellent in corrosion resistance than common ceramic materials as well as common ceramic materials (for example, alumina) are employed.

However, particles cannot be prevented completely only by altering the materials. There inevitably occur recessed portions (for example, pores, microcracks and machining scratches) on the surface layer of the ceramic members, because they are processed products of brittle materials. Fine particles generated during a surface grinding process or the like can enter into these recessed portions. It is difficult to completely remove the deposited fine particles in the recessed portions by an ordinary cleaning process. Microcracks may also occur during the production step of the ceramic members. The deposited fine particles or the microcracks are scattered as particles when they are exposed to a high temperature atmosphere, a treatment gas atmosphere, a plasma atmosphere or a vacuum atmosphere at the time of heat treatment.

Several methods for preventing the scattering of the particles derived from ceramic members have hitherto been proposed.

Patent Document 1 discloses an invention of "a method for cleaning a ceramic product, wherein the face to be cleaned of the ceramic product is coated with a solvent, then a film made of a material soluble in the solvent is brought into contact with the face, and the film is peeled off from the face and thus the face is cleaned." According to this invention, the film portion in contact with the face to be cleaned is dissolved by the solvent, and follows the asperities of the form of the face and hence the particles present on the face are surrounded by the dissolved portion of the film. Consequently, when the film is peeled off from the face to be cleaned, the particles are fixed on the film side in contact with the face and thus the particles are removed from the face.

Patent Document 2 discloses an invention of "an alumina ceramic sintered body, wherein the alumina ceramic sintered body is composed of 99.2% by weight or more and 99.99% by weight or less of aluminum oxide and the balance consisting of the oxides of metals other than aluminum, and the average particle size of the alumina sintered body is 0.5 μm or more and 15 μm or less and the density of the alumina sintered body is 3.88 g/cm³ or more and 3.97 g/cm³ or less; and the sintered body or the sintered body subjected to grinding processing is heat treated at a temperature of 1000° C. or higher and 1550° C. or lower for 0.1 hour or more and 6 hours or less."

Also proposed is a method for forming a coating film which has a high corrosion resistance, mainly with respect to thermal spraying ceramics, as a method for improving the corrosion resistance of a ceramic material.

Patent Document 3 discloses an invention of "a corrosion resistant composite member used in an environment of a halogen-based corrosive gas or in an environment of a plasma of a halogen-based corrosive gas, wherein the corrosion resistant composite member has a substrate and a coating film formed of a ceramic sol/gel, disposed on the substrate portion exposed at least to the halogen-based corrosive gas or a plasma of the halogen-based corrosive gas."

Patent Document 4 discloses an invention of "a method for forming a composite coating film which has a corrosion resistance and being durable for a long term use, wherein a single metal, an alloy, a cermet or a ceramic is thermal sprayed to the surface of a substrate, preprocessed for spraying; then a pore-sealing solution satisfactory in permeability, forming a pore-sealer in the pores in the thermal sprayed coating film, is applied or impregnated to the substrate surface; pore-sealing treatment is performed by aging or heat treatment; a solution in which a glassy substance forming component is dissolved or suspended is applied to the treated substrate with a brush or spraying; the treated substrate is dried at normal temperature or fired at a temperature of 900° C. or lower; and thus a glassy surface layer coating film is formed."

Patent Document 5 discloses an invention of "a composite coating material disposed on a ceramic member, wherein the composite coating material includes a ceramic porous body having open pores and a resin impregnated in the open pores"; in Examples of Patent Document 5, only a ceramic porous body formed by a thermal spraying method is described.

Patent Document 6 describes an invention of "a pore-sealed ceramic insulating layer, wherein in the ceramic insulating layer obtained by thermal spraying, by taking advantage of the contraction percentage difference due to the temperature difference, between a gas and a resin, pore-sealing bodies composed of a thermosetting resin are formed in the entrances of the pores generated in the ceramic insulating layer."

CITATION LIST

[Patent Document]
  [Patent Document 1] JP11-21187A
  [Patent Document 2] JP8-81258A
  [Patent Document 3] JP2003-335589A
  [Patent Document 4] JP2001-152307A
  [Patent Document 5] JP2003-119087A
  [Patent Document 6] JP2002-180233A

SUMMARY OF INVENTION

Technical Problem

The invention described in Patent Document 1 is such that a film is formed on the surface of a ceramic, then the film is peeled off from the face to be cleaned, and thus deposited fine particles which are responsible for the particles are removed. However, it is difficult to remove the fine particles entering the grain boundary or the pores.

According to the invention described in Patent Document 2, a heat treatment at 1000 to 1550° C. repairs the microcracks which are responsible for the particles. But the heat treatment cannot remove the fine particles entering the grain boundary or the pores.

The inventions described in Patent Documents 3 to 6 each intend to form a coating film on a thermal spraying ceramic, not to solve the problems of the particles. In Patent Documents 3 to 5, the functions of the ceramics cannot be fulfilled, because a coating film is formed on the whole of the ceramic surface.

In the case where a coating film is formed by thermal spraying of a ceramic or the like to thereby reduce particles, a member needing periodic cleaning, for example, undergoes the cleaning-induced detachment of the thermal sprayed layer itself from the member, and hence it is required to repeat the thermal spraying every time of cleaning or every several times of cleaning. The cost of the spraying performed every time of cleaning offers a factor to increase the running cost of the apparatus. For the purpose of reducing such cost, an invention of a permanently effective treatment method is required.

In order to solve the above-described problems, the present inventors made a diligent study of a method for permanently preventing the generation of particles while maintaining excellent corrosion resistance belonging to a ceramic sintered body, and consequently obtained the following findings.

(A) When the whole surface of a ceramic sintered body is covered with a coating film, the fundamental functions belonging to the ceramic sintered body cannot be fulfilled, and the functions as a corrosion resistant member depends on the performances of the coating film. Additionally, the whole surface covering suffers from durability problems such as degradation due to exfoliation. Therefore, preferable is a structure such that not the whole surface (the whole surface of the face exposed to the treatment atmosphere) of the ceramic sintered body is covered.

(B) One of the causes of generation of the particles is attributed to the scattering of ceramic fine particles produced at the time of firing, grinding processing or the like. These ceramic fine particles attach to the surface of the ceramic sintered body; even by using various hitherto known cleaning methods such as ultrasonic cleaning, it is difficult to completely remove the fine particles entering the gaps between crystal grain boundaries, the interior of fine pores, the inside of machining scratches or the like. Therefore, it is necessary to anchor the ceramic fine particles in these micro-spaces, instead of removing the ceramic fine particles remaining in these micro-spaces.

(C) Another cause of generation of the particles is ascribable to the detachment, during the operation of the apparatus, of the micro-pieces related to the microcracks in the ceramic member. Therefore, it is necessary to hold an anchoring agent on the surface of the ceramic member to prevent the detachment of the micro-pieces related to the microcracks.

(D) The particles that are generated by the causes described in (B) and (C) are scattered in a large amount in the comparatively initial stage of the operation of the apparatus. FIG. 5 is a graph showing the relation between the operating time and the amount of generated particles in each of the cases where a conventional ceramic member and a ceramic member with the surface coated with an anchoring agent were respectively applied in the semiconductor production equipment. As FIG. 5 shows, in the case where the conventional ceramic member was used, the amount of the generated particles is gradually decreased with the continuation of the operation, but no product treatment can be performed until the number of the particles is decreased to the number reaching the usable level. However, when the ceramic member coated with the anchoring agent is used, the amount of the generated particles can be decreased from the initial stage. Additionally, although the anchoring agent is diminished during the operation of the apparatus, the particles due to the causes described in (B) and (C) are decreased in amount with the continuation of the operation. Therefore, the ceramic member that holds the anchoring agent can permanently suppress the amount of the generated particles to a low level.

The present invention was achieved on the basis of the above-described findings to provide a ceramic member free from the occurrence of particle scattering while the fundamental functions belonging to the ceramic sintered body are fulfilled, and a method for producing the ceramic member, and a vacuum processing apparatus which employs such a ceramic member.

Solution to Problem

The present invention involves the surface-treated ceramic members presented in the following (1) to (5), the methods for producing a surface-treated ceramic member presented in the following (6) and (7), and the vacuum processing apparatus presented in the following (8).

(1) A surface-treated ceramic member which has a coating film-formed surface comprising a ceramic sintered body with a porosity of 1% or less and a sol-gel coating film of a silicon alkoxide compound polymer formed on at least a part of a ceramic sintered body, wherein the coating film and the surface of the body are coexistent in the coating film-formed surface.

(2) The surface-treated ceramic member according to (1), wherein the area of the sol-gel coating film accounts for 5 to 80% of the total area of the coating film-formed surface.

(3) The surface-treated ceramic member according to (1) or (2), wherein in the coating film-formed surface, the recessed portions of the surface of the ceramic sintered body are selectively covered with the sol-gel coating film.

(4) The surface-treated ceramic member according to any one of (1) to (3), wherein the surface-treated ceramic member is used in a vacuum processing apparatus or a controlled atmosphere processing device.

(5) The surface-treated ceramic member according to (4), wherein the coating film-formed surface is formed on at least the surface-treated ceramic member portion that is exposed to a treatment atmosphere.

(6) A method for producing a surface-treated ceramic member, wherein a coating film material composed of a sol-gel of a silicon alkoxide compound polymer is applied to the surface of a ceramic sintered body with a porosity of 1% or less, then part of the coating film material is removed under the condition that the coating film material before curing remains in the recessed portions of the surface of the ceramic sintered body, and the coating film material that remains in the recessed portions of the surface of the ceramic sintered body is cured.

(7) The method for producing a surface-treated ceramic member according to (6), wherein the removal of the part of the coating film material is performed by wiping off.

(8) A vacuum processing apparatus which employs the surface-treated ceramic member according to any one of (1) to (5).

Advantageous Effects of Invention

The present invention can prevent the scattering of the particles derived from the fine particles or microcracks which are generated at the time of firing, grinding processing or the like and remain in the micro-spaces such as the interior of the pores in the surface of a ceramic sintered body, while the fundamental function belonging to the ceramic sintered body, namely, the excellent corrosion resistance is fulfilled. Furthermore, the present invention can perform product treatments such as the film formation treatment from the initial stage of the operation of the apparatus.

DESCRIPTION OF EMBODIMENTS

1. Ceramic Sintered Body

Figure 1:
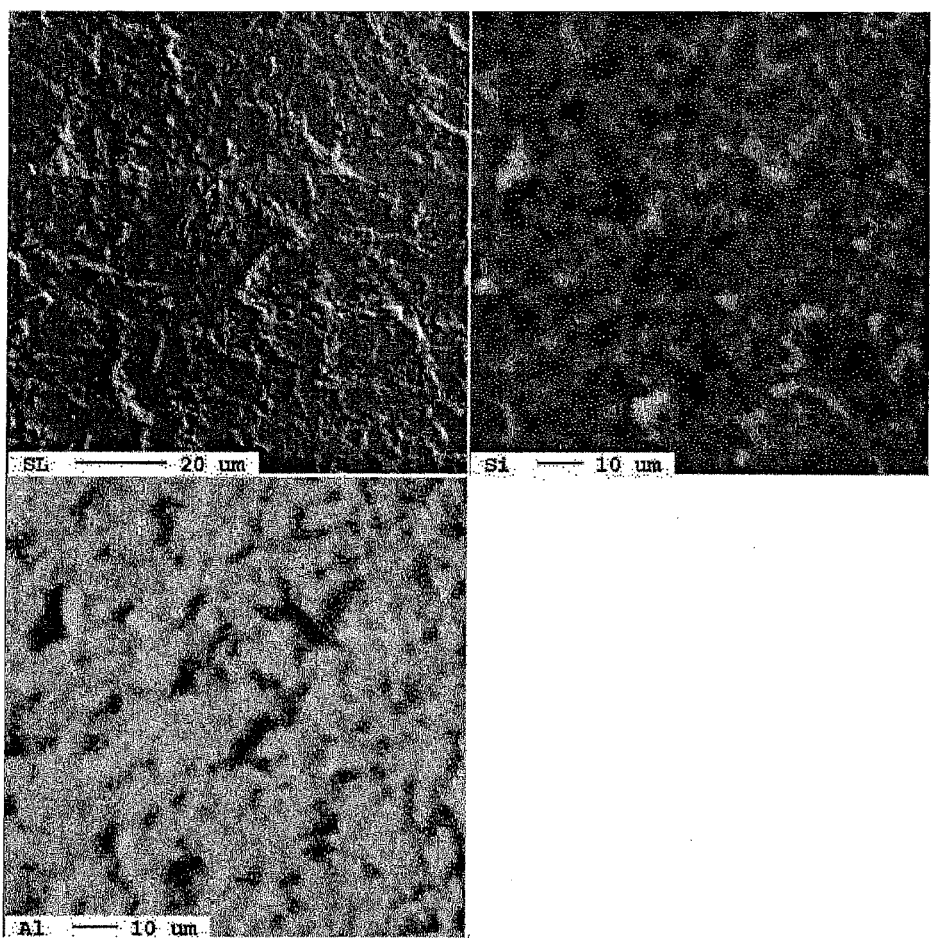
FIG. 1 shows a SEM image and the distributions of Al (an element derived from the ceramic body) and Si (an element derived from the coating film) of Example Embodiment 1 of the present invention.

As a ceramic sintered body, a dense sintered body with a porosity of 1% or less which has a micro-structure is employed in order to fulfill the fundamental chemically stable functions. This is because when the porosity exceeds 1%, the mechanical properties and the corrosion resistance are degraded. As compared to a sintered body that was sintered densely, a ceramic-sprayed coating film is poor in corrosion resistance or durability, and tends to generate particles due to particle detachment or the like, because it is porous, weak in mechanical strength and large in specific surface area. Therefore, such a ceramic-sprayed coating film cannot be used for the surface-treated ceramic member of the present invention.

Examples of the ceramic materials used in the present invention include, but not limited to, common ceramic materials such as alumina, yttria, zirconia, mullite, cordierite, silicon carbide, silicon nitride, aluminum nitride and sialon. In particular, the materials excellent in corrosion resistance and heat resistance such as alumina, aluminum nitride and yttria are preferably used.

Examples of the method for producing the ceramic sintered body include, but are not limited to, common production methods. For example, a ceramic sintered body can be produced as follows: a heretofore known molding binder is added to a powder raw material with an average particle size of about 0.01 to 1 μm; the resulting mixture is granulated by a heretofore known method such as a spray dry method; a molded body is obtained from the resulting granular material by using a mold press or CIP (cold isostatic pressing); and the resulting molded body is fired. Where necessary, a heretofore known sintering aid may be added to the powder raw material.

When a sintering aid is used for an oxide ceramic, an atmospheric furnace may be used, and for a non-oxide ceramic, for example, a nitrogen or argon used atmosphere controlled Furnace as well as a vacuum furnace may be used.

2. Coating Film Material

The surface-treated ceramic member of the present invention is characterized in that a coating film made of a sol-gel film of a silicon alkoxide compound polymer is formed on the surface of the above-described ceramic sintered body. The silicon alkoxide compound is employed because it is easily cured due to the polymerization reaction which proceeds at room temperature or by heating, and is kept stable during the operation of the apparatus. When a device to be treated is constructed of a silicon-based material, a possible scattering of the silicon alkoxide compound hardly leads to adverse effects. The sol-gel film of the silicon alkoxide compound polymer also has a merit of simplicity in the sense that a film can be formed by using a solution thereof.

The surfaces of the coating film and the ceramic sintered body are required to be coexistent in the treated surface of the ceramic sintered body, where the recessed portions (the gaps between crystal grain boundaries, the interior of fine pores, the inside of machining scratches or the like) at least on the surface of the ceramic sintered body that is exposed to the treatment atmosphere in semiconductor production equipment or the like are selectively covered with the coating film and the portions other than the recessed portions of the ceramic sintered body are uncoated. The treatment atmosphere as referred to herein means a treatment gas atmosphere (an atmosphere of argon gas, hydrogen gas or corrosive gas such as a halogen), a plasma atmosphere, a vacuum atmosphere at the time of heat treatment, or the like.

As described above, fine particles and the like remain in the recessed portions of the ceramic sintered body, and microcracks may be formed during the firing process, the working process or the like. The coating film that is selectively covering the recessed portions undertakes a role of capturing the fine particles in the recessed portions to prevent the scattering of the fine particles, and at the same time a role of preventing the detachment of the micro-pieces related to the generation of microcracks. On the other hand, the portions other than the recessed portions of the ceramic sintered body which is excellent in corrosion resistance are exposed. The surface portions where the ceramic sintered body is exposed are originally flat and smooth portions which are free from recesses. Thus it is easy to remove the fine particles by cleaning or the like and particles are hardly generated from the surface. Consequently, the portions of the ceramic sintered body should be uncoated so as to fulfill the fundamental function thereof.

The area of the coating film on the treated surface of the ceramic sintered body preferably accounts for 5 to 80% of the total area of the surface-treated surface. Specifically, when the area ratio of the coating film is less than 5%, the effect of capturing the fine particles and the like may be insufficient enough to prevent the particle scattering. On the other hand, when the area ratio of the coating film exceeds 80%, the fundamental functions of the ceramic sintered body may not be fulfilled.

The area ratio of the coating film can be determined by the following method.

(1) The distribution of the main element (for example, Si is the main element of the Si-based alkoxide compound) derived from the coating film material is mapped by observing the arbitrarily-selected parts of the surface-treated ceramic member with a wavelength-dispersive electron probe microanalyzer (EPMA).

(2) The distribution of the main element (for example, Al is the main element of alumina) derived from the ceramic body is mapped by the same method as described in (1), and is verified to be complementarily related with the distribution mapped in (1).

(3) From the detected X-ray intensity and the measured area, the area ratio of the main element derived from the coating film material is determined as the area ratio of the coating film. Specifically, in order to remove the noises due to X-ray scattering and the surface condition, a threshold value is set at 0.20 times the maximum detected X-ray intensity, the detected X-ray intensities are divided into two partitions, and the area ratio of the region in which the detected X-ray intensity is equal to or larger than the threshold value is defined as the area ratio of the coating film.

For the purpose of making the surfaces of the ceramic body and the coating film be coexistent in the treated surface, a useful processing is such that the above-mentioned coating film material is applied to the ceramic sintered body and the coating film material is wiped off with waste cloth before the coating film material is completely cured, and the coating film material that remains on the surface of the ceramic sintered body is dried and cured. Although even one run of this operation is enough to exert the effect thereof, it is preferable to perform two or more runs of this operation. Examples of the surface of the body may include, in addition to a ground surface, a fired surface, a heat treated surface and a blasted surface.

The coating film material solution can be easily removed on a comparatively flat and smooth surface (on such a surface, fine particles hardly remain), while in the recessed portions (for example, pores), the coating film material solution remains, and is dried and cured to cover the recessed portions of the ceramic sintered body. The detachment of the coating film formed in the recessed portions scarcely occurs, because the coating film strongly covers the recessed portions due to the anchor effect.

EXAMPLE 1

Different ceramic bodies (surface roughness Ra: 0.7±0.1 μm, dimension: 30 mm×30 mm×2.5 mm) having the compositions and the porosities listed in Table 1 were prepared, and to these ceramic bodies, the coating film materials shown in Table 1 were applied and wiped off with waste cloth to prepare specimens. For each of the specimens, the area ratio of the coating film and the amount of the generated particles were obtained. For some Examples, the vacuum chamber components of semiconductor production equipment were actually fabricated, mounted in the apparatus and examined with respect to the use condition.

<Area Ratio of Coating Film>

Each of the specimens was beforehand subjected to gold evaporation with a sputtering film formation apparatus for SEM test (SC-704, manufactured by Sanyu Electron Co., Ltd.) to form a conductive film, and a SEM image and the distributions of the elements derived from the ceramic body and the coating film material were scanned and mapped with an analyzer (JXA-8100, manufactured by JEOL Ltd.) under the conditions that the field of vision was 100 μm×100 μm and the acceleration voltage was 15 kV. In this way, the complementary relation between the distributions of the element derived from the substrate and the coating film material was verified. Subsequently, a threshold value was set at 0.20 times the maximum detected X-ray intensity, the detected X-ray intensities were divided into two partitions, and the area ratio of the region in which the detected X-ray intensity was equal to or larger than the threshold value was defined as the area ratio of the coating film.

<Number of Particles>

In a beaker with pure water, each of the specimens was placed; the beaker was set in a vessel equipped with an ultrasonic oscillator, and loaded with an ultrasonic wave of 104 kHz at room temperature for 1 minute; the number of the particles scattered in the pure water in the beaker was measured with a submerged particle counter (measurement range: 0.5 to 20 μm); the number of particles of 1 μm or more is shown in Table 1.

TABLE 1

| | | Ceramic body | | Coating film | | | Evaluation | |
|---|---|---|---|---|---|---|---|---|
| | | Material | Porosity (%) | Material | Number of application | Area ratio (%) | Number of particles (/ml) | Result |
| Example Embodiments of the present invention | 1 | $Al_2O_3$ (sintered) | 0.1 | Tetraethoxysilane | 2 | 16 | 45 | Good |
| | 2 | $Al_2O_3$ (sintered) | 0.3 | Tetraethoxysilane | 1 | 48 | 37 | — |
| | 3 | $Al_2O_3$ (sintered) | 0.1 | Methyltriethoxysilane | 3 | 51 | 18 | Good |
| | 4 | AlN (sintered) | 0.5 | Tetraisopropoxysilane | 2 | 64 | 26 | — |
| | 5 | $Al_2O_3$ (sintered) | 0.9 | Tetraethoxysilane | 2 | 78 | 81 | — |
| Comparative Examples | 1 | $Al_2O_3$ (sintered) | 0.1 | —* | — | — | 480 | a large number of particles |
| | 2 | $Y_2O_3$ (sintered) | 0.2 | —* | — | — | 560 | — |
| | 3 | $Al_2O_3$ (sintered) | 0.9 | Tetraethoxysilane | 1** | 100* | 19 | Exfoliation of the coating film |
| | 4 | $Al_2O_3$ (sintered) | 3.0* | Dimethyldimethoxysilane + Tetraethoxysilane | 2 | 85* | 850 | — |

TABLE 1-continued

| | Ceramic body | | Coating film | | | Evaluation | |
| --- | --- | --- | --- | --- | --- | --- | --- |
| | Material | Porosity (%) | Material | Number of application | Area ratio (%) | Number of particles (/ml) | Result |
| 5 | Y$_2$O$_3$ (sprayed) | 9.0* | Tetraethoxysilane | 1 | 91* | 2697 | — |
| 6 | Al$_2$O$_3$ (sprayed) | 17.0* | Tetraisopropoxysilane | 3 | 98* | 3474 | — |
| 7 | AlN (sprayed) | 1.2* | Tetraisopropoxysilane | 2 | 73 | 240 | — |

*indicates out of the range of the present invention.
**indicates the application without wiping off.

As shown in Table 1, in each of Example Embodiments 1 to 5 of the present invention, the number of particles was within a satisfactory range from 18 to 81 particles/ml. Hereinafter, for each of Example Embodiments 1 and 3 of the present invention, a SEM image and the distributions of the elements derived from the ceramic body and the coating film are presented and the technique for obtaining the area ratio of the coating film from the distribution of the element derived from the coating film is concretely described.

Figure 2:
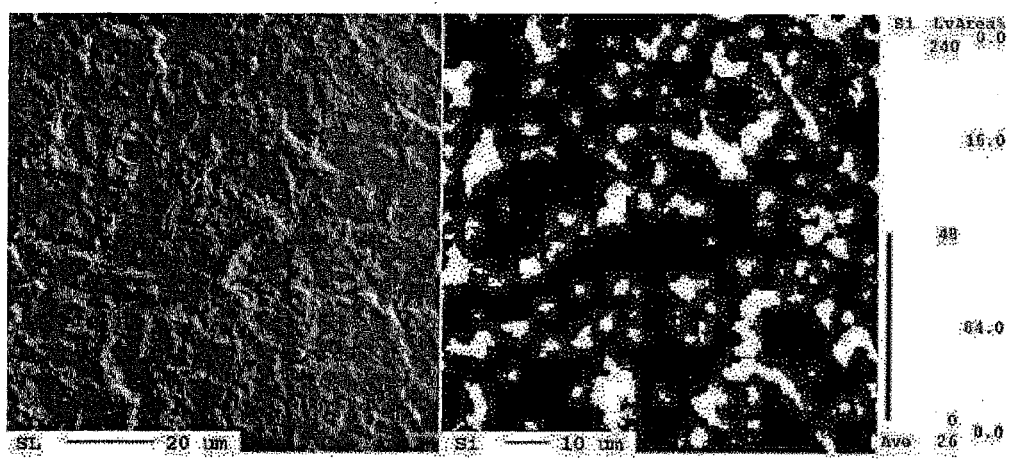
FIG. 2 shows the SEM image and the distribution of Si (an element derived from the coating film), based on the two partitions provided by the technique described below, of Example Embodiment 1 of the present invention.

FIG. 1 shows, for Example Embodiment 1 of the present invention, the SEM image and the distributions of Al (an element derived from the ceramic body) and Si (an element derived from the coating film) with reference to the maximum of the detected X-ray intensity, and FIG. 2 shows, for Example Embodiment 1 of the present invention, the SEM image and the distribution of Si (an element derived from the coating film) based on the two partitions provided by the above-described technique. In these figures, SL denotes the SEM image, and Si and Al denote the distributions of Si and Al, respectively. The SEM images and the distribution maps of Al and Si in FIGS. 1 and 2 are associated with the same portion and correspond in a one-to-one manner to be superposable with each other.

As shown in FIG. 1, in Example Embodiment 1 of the present invention, Al and Si are found to be complementarily related to each other, and the surfaces of the body and the coating film are found to be coexistent. As shown in FIG. 2, the maximum of the detected X-ray intensity in the distribution of Si is 240, and from the two partitions formed with the threshold value of 48, namely 0.20 times 240, the area ratio (of the coating film) of the region where the detected X-ray intensities are equal to or larger than the threshold value is calculated to be 16.0%.

Figure 3:
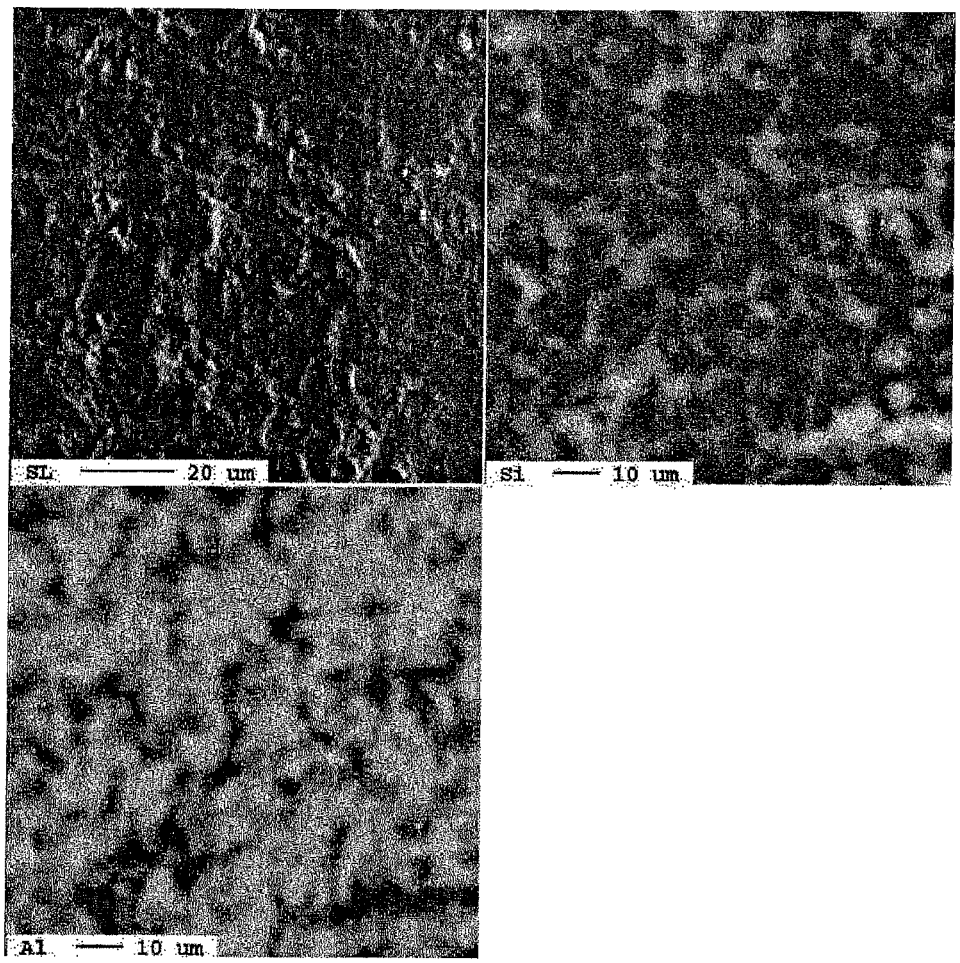
FIG. 3 shows a SEM image and the distributions of Al (an element derived from the body) and Si (an element derived from the coating film) of Example Embodiment 3 of the present invention.
Figure 4:
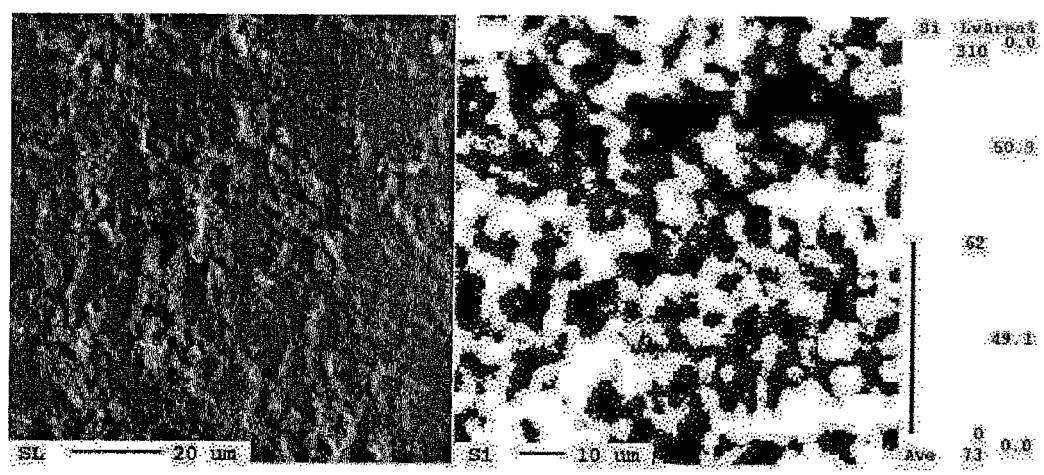
FIG. 4 shows the SEM image and the distribution of Si (an element derived from the coating film), based on the two partitions provided by the technique described below, of Example Embodiment 3 of the present invention.
Figure 5:
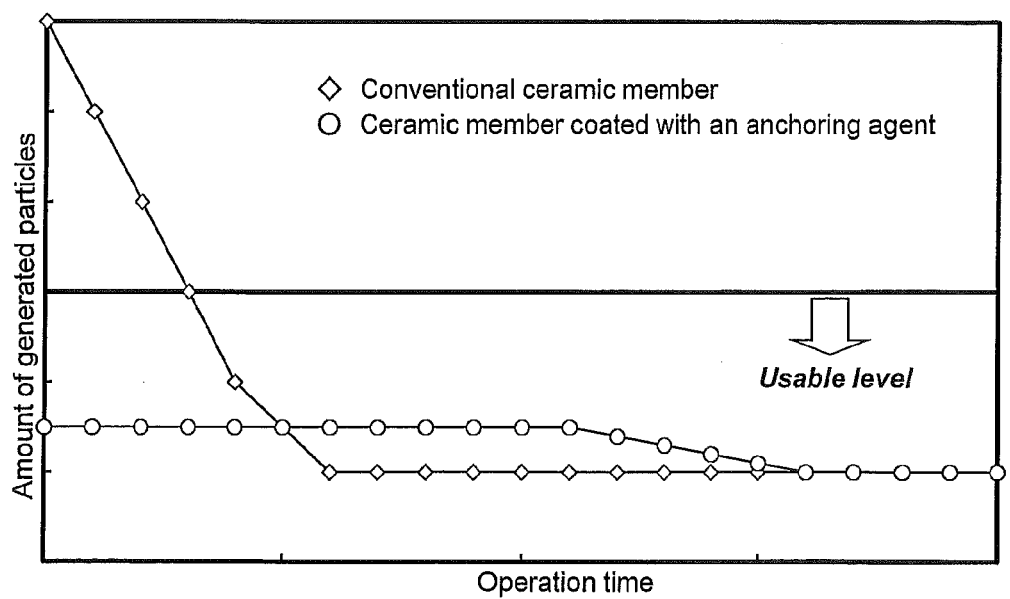
FIG. 5 is a graph showing the relation between the operating time and the amount of generated particles in each of the cases where a conventional ceramic member and a ceramic member with the surface coated with an anchoring agent were respectively applied in the semiconductor production equipment.

FIG. 3 shows, for Example Embodiment 3 of the present invention, the SEM image and the distributions of Al (an element derived from the ceramic body) and Si (an element derived from the coating film) with reference to the maximum of the detected X-ray intensity, and FIG. 4 shows, for Example Embodiment 3 of the present invention, the SEM image and the distribution of Si (an element derived from the coating film) based on the two partitions provided by the above-described technique. In these figures, SL denotes the SEM image, and Si and Al denote the distributions of Si and Al, respectively. The SEM images and the distribution maps of Al and Si in FIGS. 3 and 4 are associated with the same portion and correspond in a one-to-one manner to be superposable with each other.

As shown in FIG. 3, in Example Embodiment 3 of the present invention, Al and Si are found to be complementarily related to each other, and the surfaces of the body and the coating film are found to be coexistent. As shown in FIG. 4, the maximum of the detected X-ray intensity in the distribution of Si is 310, and from the two partitions formed with the threshold value of 62, namely 0.20 times 310, the area ratio (of the coating film) of the region where the detected X-ray intensities are equal to or larger than the threshold value is calculated to be 50.9%.

On the other hand, Comparative Example 1 is an example in which alumina is used for the ceramic body and Comparative Example 2 is an example in which yttria (Y$_2$O$_3$) known to have high corrosion resistance is used for the body where both of the bodies were not covered by the coating film. And, these result in a large number of particles. In Comparative Example 3 with a coating film which covers the whole surface, the number of particles at the initial stage was small, but the 2-hour use as the chamber component in semiconductor production equipment resulted in an abrupt increase of the number of particles because of exfoliation. In each of Comparative Examples 4 to 7, a spraying ceramic with high porosity was used for the body. The number of particles could not have been diminished even though the body was covered by a coating film.

EXAMPLE 2

In each of Example Embodiment 3 of the present invention and Comparative Example 1 shown in Table 1, a ceramic member was disposed as a deposition preventive shield used in a plasma treatment chamber of semiconductor production equipment, and the number of generated particles was examined with a particle counter (SPI manufactured by KLA-Tencor Corp.). The examination was performed as follows: 25 wafers were plasma treated, and six wafers in total, namely, the first, fifth, tenth, 15th, 20th and 25th wafers were subjected to the measurement of the number of the particles of 1 μm or more present on the wafer. The results are shown in Table 2. The same ceramic member of Example Embodiment 3 of the present invention was subjected to five times of cleaning usually required for maintenance, then mounted again in a working apparatus, and then subjected to the examination of the number of generated particles in the same manner as described above. The result is also shown in Table 2 under the heading of Example Embodiment 6 of the present invention.

TABLE 2

| | #1 | #5 | #10 | #15 | #20 | #25 | Average |
| --- | --- | --- | --- | --- | --- | --- | --- |
| Comparative Example | 1 | 8 | 12 | 20 | 21 | 22 | 18 | 16.8 |
| Example | 3 | 0 | 0 | 6 | 0 | 0 | 0 | 1.0 |

TABLE 2-continued

|  | #1 | #5 | #10 | #15 | #20 | #25 | Average |
|---|---|---|---|---|---|---|---|
| Embodiments of the present invention | 6 | 0 | 1 | 6 | 9 | 4 | 0 | 3.3 |

As shown in Table 2, with the ceramic member of Comparative Example 1, on average as many as 16.8 particles attached to every wafer; however, with the ceramic member of Example Embodiment 3 of the present invention, on average almost no particle, namely, 1.0 particle attached to each of the wafers, and also with the ceramic member of Example Embodiment 6 of the present invention, subjected to cleaning five times, on average as few as 3.3 particles attached to each of the wafers to verify that the advantageous effect of the present invention was maintained even after cleaning.

[Industrial Applicability]

The present invention can prevent the scattering of the particles derived from the fine particles or microcracks which are generated at the time of firing, grinding processing or the like and remaining in the micro-spaces such as the interior of the pores in the surface of a ceramic sintered body, while the fundamental function belonging to the ceramic sintered body, namely, the excellent corrosion resistance is fulfilled. Therefore, the surface-treated ceramic member of the present invention is most suitably used, for example, for the member exposed to a high temperature atmosphere, a treatment gas atmosphere or a plasma atmosphere in a heating unit in semiconductor device production equipment, liquid crystal display production equipment or a precise analytical instrument.

The invention claimed is:

1. A surface-treated ceramic member, which has a coating film-formed surface, comprising:
    a ceramic sintered body with a porosity of 1% or less and having recessed portions on a surface thereof; and
    a sol-gel coating film of a silicon alkoxide compound polymer formed on at least a part of a ceramic sintered body,
    wherein the sol-gel coating film and the surface of the body are coexistent in the coating film-formed surface, and further wherein the sol-gel coating film accounts for 5 to 80% of a total area of the coating film-formed surface and all of the recessed portions of the surface of the ceramic sintered body are selectively covered with the sol-gel coating film.

2. The surface-treated ceramic member according to claim 1, wherein the surface-treated ceramic member is used in a vacuum processing apparatus or a controlled atmosphere processing device.

3. The surface-treated ceramic member according to claim 2, wherein the coating film-formed surface is formed on at least the surface-treated ceramic member portion that is exposed to a treatment atmosphere of the vacuum processing apparatus or the controlled atmosphere processing device.

4. A vacuum processing apparatus which employs the surface-treated ceramic member according to claim 3.

5. A vacuum processing apparatus which employs the surface-treated ceramic member according to claim 2.

6. A vacuum processing apparatus which employs the surface-treated ceramic member according to claim 1.

* * * * *